United States Patent
Kim et al.

(10) Patent No.: US 8,109,199 B2
(45) Date of Patent: Feb. 7, 2012

(54) RECIPROCATING COMPRESSOR

(75) Inventors: Sung-Gi Kim, Seoul (KR); Dong-Han Kim, Seoul (KR)

(73) Assignee: LG Electronics Inc., Seoul (KR)

(*) Notice: Subject to any disclaimer, the term of this patent is extended or adjusted under 35 U.S.C. 154(b) by 867 days.

(21) Appl. No.: 12/219,548

(22) Filed: Jul. 23, 2008

(65) Prior Publication Data
US 2009/0101003 A1    Apr. 23, 2009

(30) Foreign Application Priority Data
Oct. 19, 2007 (KR) .................. 10-2007-0105773

(51) Int. Cl.
*F01B 31/10* (2006.01)
*F16J 10/02* (2006.01)

(52) U.S. Cl. ............. 92/159; 92/84; 92/140; 92/169.1

(58) Field of Classification Search ........... 92/84, 129, 92/140, 158, 159, 169.1; 417/417
See application file for complete search history.

(56) References Cited

U.S. PATENT DOCUMENTS

| | | | | | |
|---|---|---|---|---|---|
| 3,153,987 | A | * | 10/1964 | Thoma | 92/158 |
| 5,816,134 | A | * | 10/1998 | Takenaka et al. | 92/159 |
| 7,124,678 | B2 | * | 10/2006 | Lee et al. | 92/84 |
| 7,179,065 | B2 | * | 2/2007 | Kim | 417/417 |

FOREIGN PATENT DOCUMENTS

| | | |
|---|---|---|
| KR | 10-1999-0081548 | 9/2000 |
| KR | 10-2001-0064577 A | 7/2001 |
| KR | 10-2005-0017250 | 2/2005 |

* cited by examiner

*Primary Examiner* — Michael Leslie
(74) *Attorney, Agent, or Firm* — McKenna Long & Aldridge LLP

(57) ABSTRACT

A reciprocating compressor comprises: a cylinder having an oil pocket on an inner circumferential surface of a piston insertion hole for inserting a piston with a predetermined width and depth; and a piston having a bearing portion protruding so as to slidably contact an inner circumferential surface of the piston insertion hole, and inserted into the piston insertion hole of the cylinder, wherein the bearing portion is formed to have a length shorter than that of the oil pocket of the cylinder. Accordingly, a frictional loss between the cylinder and the piston is reduced.

23 Claims, 3 Drawing Sheets

RECIPROCATING COMPRESSOR

This application claims priority from Korean Application No. 10-2007-0105773, filed on Oct. 19, 2007, which is hereby incorporated by reference in its entirety.

BACKGROUND OF THE INVENTION

The present disclosure relates to a reciprocating compressor that includes a cylinder and a piston, and more particularly, to a reciprocating compressor capable of reducing a frictional area between the cylinder and the piston, thereby allowing the piston to more effectively and efficiently reciprocate within the cylinder. The reciprocating compressor is also capable of facilitating the assembly process involving the cylinder and the piston.

Generally, a reciprocating compressor serves to intake, compress, and discharge a refrigerant as a piston linearly reciprocates within a cylinder. The reciprocating compressor may be classified into a connection type reciprocating compressor or a vibration type reciprocating compressor according to the method employed to drive the piston. In the connection type reciprocating compressor, the piston is connected to a rotating shaft associated with a rotation motor by a connection rod, which causes the piston to reciprocate within the cylinder, thereby compressing the refrigerant. On the other hand, in the vibration type reciprocating compressor, the piston is connected to a mover associated with a reciprocating motor, which vibrates the piston while the piston is reciprocated within the cylinder, thereby compressing the refrigerant. Hereinafter, the term "reciprocating compressor" will refer to the vibration type reciprocating compressor.

A conventional reciprocating compressor comprises a reciprocating motor including an outer stator, an inner stator, and a mover disposed between the two cylindrical stators; a cylinder forcibly inserted into the inner stator which is either fixed to a frame or configured to perform reciprocation together with the mover. The reciprocating compressor also includes a piston coupled to the mover, for compressing a refrigerant while performing a reciprocation within the cylinder; and resonant springs disposed at the front and rear ends of the piston, for inducing piston motion relative to the cylinder. A suction passage, through which refrigerant is drawn in, is formed in the piston, and a suction valve is disposed at the same end of the piston. Also, a discharge valve is disposed at the fore end of the cylinder.

As the piston reciprocates with respect to the cylinder, the reciprocating compressor intakes, compresses and discharges refrigerant. The above process is repeatedly performed. However, with conventional reciprocating compressors, there are significant problems associated with assembly. More specifically, there are a plurality of bearing portions formed on the outer circumferential surface of the piston and oil pickets associated with the inner circumferential surface of the cylinder. During assembly, sliding each of the bearing portions past the oil pockets can be difficult. To minimize the difficulty, the length of the bearing portions can be increased relative to the length of the oil pockets. But this increases the frictional area between the cylinder and the piston. This, in turn, causes the undesirable affect of increasing the frictional loss of the reciprocating compressor.

SUMMARY OF THE INVENTION

Therefore, one objective set forth herein is to provide a reciprocating compressor that is configured to facilitate the assembly process when the piston is inserted into the cylinder and to ensure a more reliable reciprocation operation.

Another objective set forth herein is to provide a reciprocating compressor that is configured such that it does not increase, but in fact, decreases the frictional area between the inner circumferential surface of the cylinder and the outer circumferential surface of the piston.

In accordance with a first aspect of the present invention, the aforementioned and other objectives are achieved by a reciprocating compressor comprising: a cylinder having an inner circumferential surface that forms a piston insertion hole the inner circumferential surface including an oil pocket portion; and a piston positioned in the piston insertion hole, the piston having a bearing portion slidably in contact with the inner circumferential surface of the cylinder, wherein the length of the bearing portion is less than the length of the oil pocket portion.

In accordance with a second aspect of the present invention, the aforementioned and other objectives are achieved by a reciprocating compressor comprising: a cylinder having an inner circumferential surface forming a piston insertion hole, the inner circumferential surface including an oil pocket; and a piston positioned in the piston insertion hole, the piston having a bearing portion slidably in contact with the inner circumferential surface of the cylinder and having a pumping portion separated from the bearing portion by a gap.

The foregoing, as well as other objectives, features, aspects and advantages will become more apparent from the following detailed description including the accompanying drawings.

BRIEF DESCRIPTION OF THE DRAWINGS

The accompanying drawings, which are included to provide a further understanding of the invention, which are incorporated in and constitute a part of this specification, illustrate exemplary embodiments of the present invention and together with the description serve to explain the principles of the invention.

DETAILED DESCRIPTION OF THE ILLUSTRATED EMBODIMENTS

Figure 1:
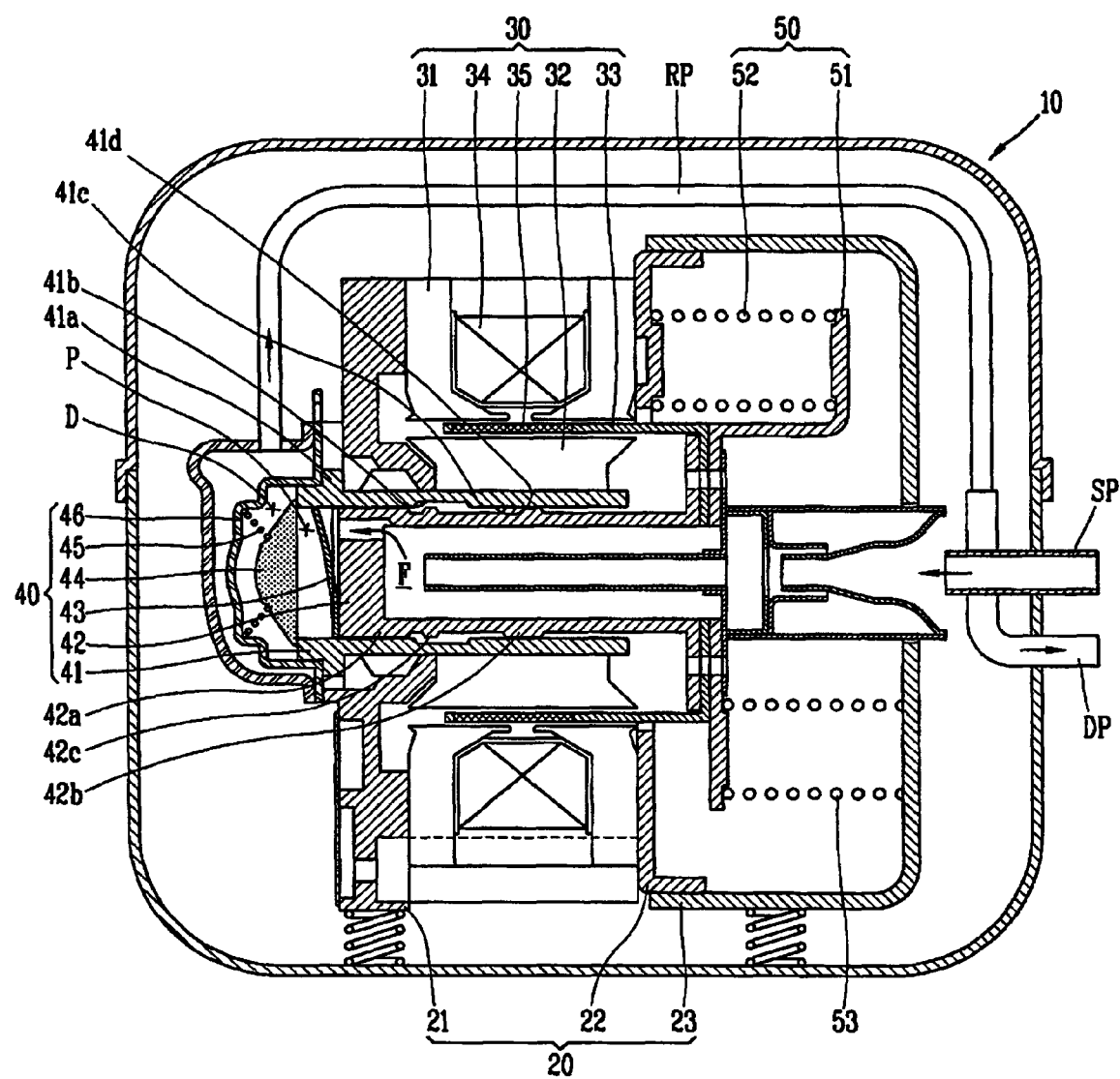
FIG. 1 is a sectional view showing a reciprocating compressor according to a first embodiment of the present invention.

Reference will now be made in detail to several exemplary embodiments of the present invention. These exemplary embodiments are further illustrated in the accompanying drawings.

FIGS. 1-4 present various sectional views of a reciprocating compressor according to a first exemplary embodiment of the present invention. As shown, the reciprocating compressor comprises a casing 10 to which a gas suction pipe SP and a gas discharge pipe DP are connected, and a frame unit 20 elastically supported in the casing 10. The reciprocating compressor also comprises a reciprocating motor 30 supported by the frame unit 20 the reciprocating motor 30 having a mover 33, and a compression unit 40, supported by the frame unit 20, where the compression unit 40 includes a piston 42 coupled to the mover 33 of the reciprocating motor 30. The reciprocating compressor further comprises a plurality of resonant units 50 for inducing a resonant motion in the piston 42 by elastically supporting the mover 33 and the piston 42 in the direction of movement of the piston 42.

The frame unit 20 includes a first frame 21 which supports the compression unit 40 and the front side of the reciprocating motor 30. A second frame 22 is coupled to the first frame 21 for supporting the rear side of the reciprocating motor 30. A third frame 23 is coupled to the second frame 22 for supporting the resonate units 50.

The reciprocating motor 30 includes an outer stator 31 supported between the first frame 21 and the second frame 22. The outer stator 31 has a coil 34 wound thereon. The reciprocating motor 30 also includes an inner stator 32 positioned between the outer stator 31 and the compression unit 40. Between the outer stator 31 and the inner stator 32, there is a gap of predetermined size. Still further, the reciprocating motor 30 includes a mover 33 having a magnet 35 that is positioned relative to coil 34 of the outer stator 31. The mover 33 linearly reciprocates according to a magnetic flux between the outer stator 31 and the inner stator 32.

Figure 2:
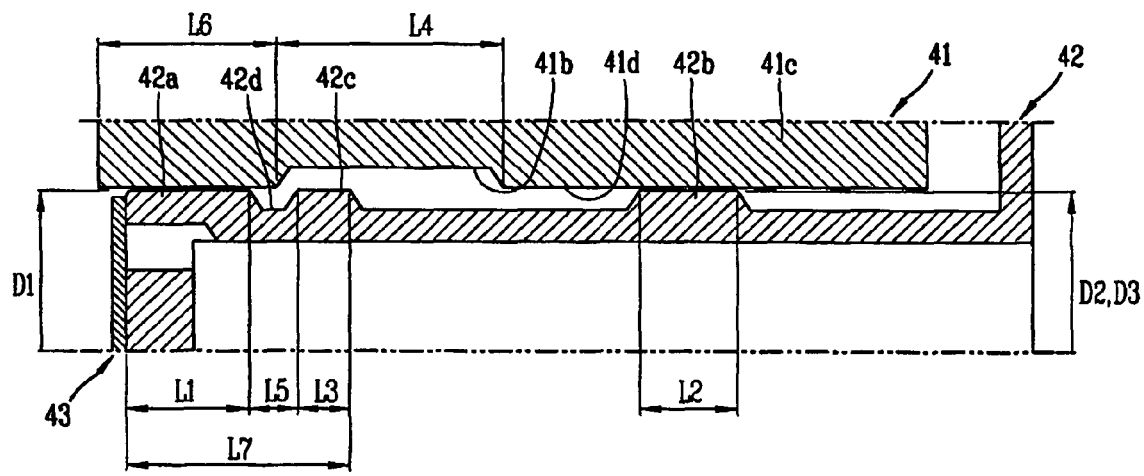
FIG. 2 is a sectional view showing a compression unit for a reciprocating compressor according to the first exemplary embodiment of the present invention.

FIG. 2, is a sectional view showing a compression unit, for example, compression unit 40, according to the first exemplary embodiment of the present invention. As shown, the compression unit 40 includes a cylinder 41. Cylinder 41 may be integrally formed with the first frame 21 or formed independent of and then inserted into the first frame 21. As previously stated, the compression unit 40 includes a piston 42 coupled to mover 33. The piston 42 reciprocates back and forth within compression space P of cylinder 41. A suction valve 43 mounted at the fore or front end of the piston 42 controls the intake of refrigerant gas through the opening and closing of a suction passage F in the piston 42.

A discharge valve 44 disposed at a front or discharge side of cylinder 41 controls the discharge of compressed gas through the opening and closing of the compression space P of cylinder 41. Referring back to FIG. 1, a valve spring 45 elastically supports the discharge valve 44, and a discharge cover 46 fixed to the first frame 21 at the discharge side of the cylinder 41 receives the discharge valve 44 and the valve spring 45.

Figure 3:
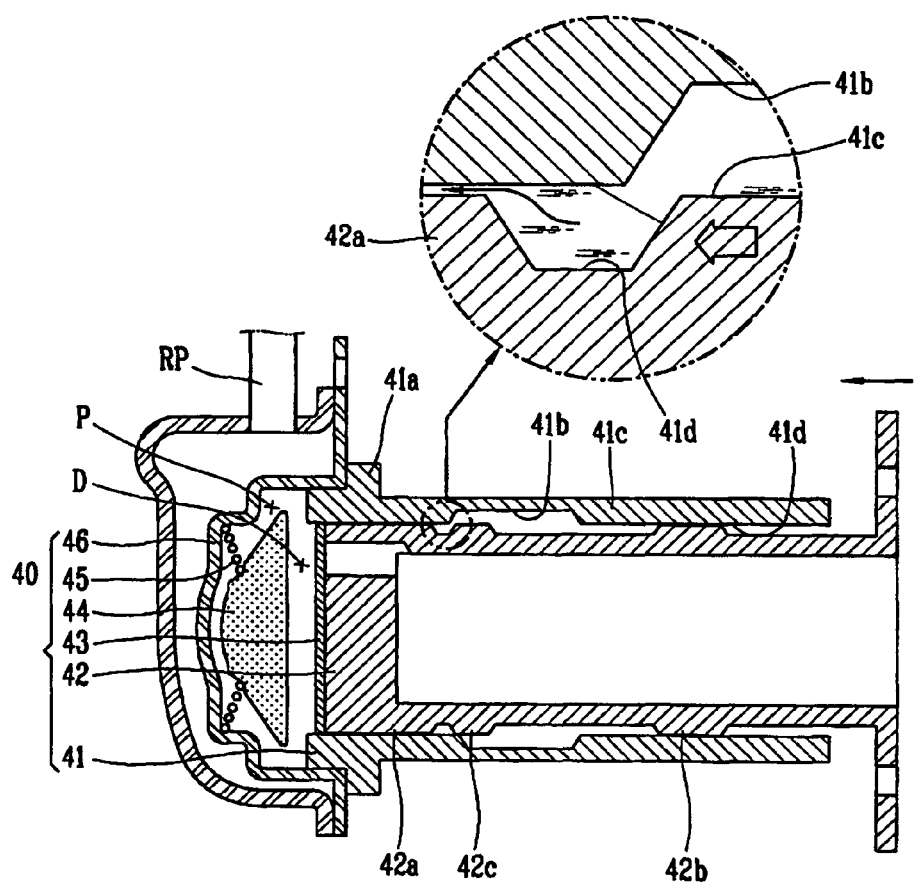
FIGS. 3 and 4 are longitudinal sectional views, respectively, showing two exemplary positions of the piston of the reciprocating compressor as it performs reciprocation.

Again referencing FIG. 2, the cylinder 41 includes a body portion 41c having a cylindrical shape. As stated above, the cylinder 41 may be integrally formed with first frame or formed independent of and inserted into first frame 21. The cylinder 41 also includes a flange 41a, as shown in FIG. 1 and FIG. 3, extending from an outer circumferential surface of body portion 41c. The flange 41a is formed towards the front end of the cylinder 41, as shown, located proximate to the discharge valve 44. A piston hole 41d formed in the body 41c facilitates the insertion of piston 42. Moreover, an oil pocket 41b is formed on an inner circumferential surface of the piston inserting hole 41d. The oil pocket 41b has a predetermined length and depth for storing oil.

Figure 4:
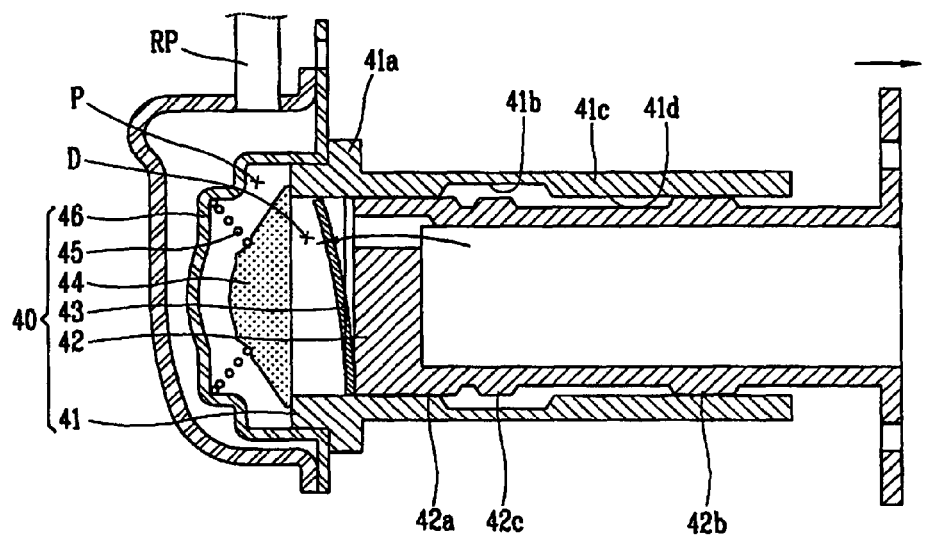

As shown in FIGS. 1, 3 and 4, P represents a compression space. Once the piston 42 is in place in the piston inserting hole 41d, the piston inserting hole 41d, the piston 42 and the discharge valve 44 together form the compression space P.

The piston 42 may be formed of the same material or a different material as cylinder 41. However, it may be preferably to form the piston 42 from a material having a similar hardness as cylinder 41. Doing so would help to reduce the friction generated when the piston 42 reciprocates within the cylinder 41.

The piston 42 further comprises a suction valve F, through which, refrigerant is drawn into compression space P. A bearing portion 42a, as illustrated in FIGS. 2 and 3, slidably contacts the inner circumferential surface of the cylinder 41. It is formed towards the front end of the piston 42, as shown, in proximity to the suction valve 43. A support portion 42b, which is supported by cylinder 41, is formed towards the rear end of the piston 42, as shown. The piston 42 still further comprises a pumping portion 42c formed between the bearing portion 42a and the support portion 42b, that is, to the rear of bearing portion 42a. The pumping portion 42c, in conjunction with pumping space 42d, pumps out the oil stored in oil pocket 41b.

The bearing portion 42a has an outer diameter (D1) slightly larger than outer diameter (D2) of the support portion 42b, as well as the outer diameter (D3) of the pumping portion 42c. This allows the outer circumferential surface of the bearing portion 42a to more easily slide as it contacts the inner circumferential surface of the cylinder 41.

Additionally, the bearing portion 42a has a length (L1) that is shorter than length (L4), the length of oil pocket 41b. Also, the length (L1) of bearing portion 42a is set such that bearing portion 42a does not overlap oil pocket 41b when the piston 42 reciprocates back and forth within cylinder 41. However, if the length (L1) of the bearing portion 42a is too short, the refrigerant in compressed space P of cylinder 41 may leak out. Accordingly, the bearing portion 42a is formed to have a length (L1) that is at least long enough to prevent the refrigerant from leaking, but sufficiently short to avoid overlap with the oil pocket 41b and to minimize frictional loss. Preferably, the fore end of piston 42 is rounded so that the bearing portion 42a can achieve a sealing operation.

With regard to the support portion 42b, the length (L2) is preferably set so that the support portion 42b does not overlap the oil pocket 41b when the piston 42 reciprocates back and forth within cylinder 41. Moreover, as the length (L2) of the support portion 42b increases, so to does the frictional loss. However, if the length (L2) of the support portion 42b is too short, the stability and uniformity of the piston 42, as it reciprocates within the cylinder 41, may be compromised. Accordingly, the length (L2) of the support portion 42b is preferably set so that it is shorter than the length (L4), the length of the oil pocket 41b, but not so short that the stability of the piston 42 is compromised.

The pumping portion 42c and the bearing portion 42a are spaced apart from each other as shown, for example, in FIG. 2, such that pumping space 42d is formed there between. The length (L5) of pumping portion 42d should be sufficient so that the position of the pumping space 42d coincides with oil pocket 41b during certain intervals when the piston 42 is reciprocating within cylinder 41. To achieve this, the length (L3) of the pumping portion 42c maybe formed such that it is shorter than length (L4) of the oil pocket 41b. Likewise, length (L5) of the pumping space 42d maybe formed so that it is shorter than the length (L4) of the oil pocket 41b. Length (L5), as shown, may also be formed so that it is shorter than length (L6), which is the length from the front end of the cylinder 41 to the oil pocket 41b.

Length (L7) covers the length of bearing portion 42a (L1), the length of pumping space 42d (L5), and the length of pumping porting 42c (L3). Thus, length (L7) begins at the fore end of the piston 42, proximate to the suction valve 43, and extends afterward to the end of the pumping portion 42c. Length (L7) should be longer than length (L4) of the oil pocket 41b. If length (L7) is longer than length (L4), the bearing portion 42a of piston 42 is prevented from being inserted into the oil pocket 41b. This is particularly advantageous during the assembly process, whereby the piston 42 is far less likely to get caught when it is being positioned in, i.e. inserted into, the cylinder 41.

Referring back to FIG. 1, each of the resonant units 50 includes a spring supporter 51 coupled to a connection portion between mover 33 and piston 42. The first resonant springs 52 are supported by the front side of spring supporter 51. The second resonant springs 53 are supported by the rear side of the springs supporter 51.

The reciprocating compressor further includes a compression space P and a discharge space D which are illustrated in FIGS. 1, 3 and 4. The reciprocating compressor also includes a loop pipe RP, as shown in FIGS. 3 and 4.

Referring to FIGS. 1, 3 and 4, when a magnetic flux forms between the outer stator 31 and the inner stator 32, as power is supplied to the reciprocating motor 30, the mover 33 disposed between the outer stator 31 and the inner stator 32 is continuously reciprocated by the resonant unit 50. When the piston 42 moves in cylinder 41, a refrigerant inside the casing 10 is drawn into the compression space P of the cylinder 41 via the suction passage F of piston 42 and the suction valve 43. When the piston 42 moves forward in the cylinder 41, the refrigerant in compression space P is compressed and then discharged when the discharge valve 44 opens. The above process is then repeatedly performed.

As the piston 42 is reciprocates within cylinder 41, a portion of the outer circumferential surface of the piston 42, and more specifically, the outer circumferential surface of the bearing portion 42a, slidbly contacts an inner circumferential surface of cylinder 41. Furthermore, the reciprocating motion of the piston 42 causes the oil stored in oil pocket 41b to be transferred to the pumping space 42d. As the piston 42 continues to reciprocate, the oil in pumping space 42d is supplied to the inner circumferential surface of the cylinder 41 and the outer circumferential surface of bearing portion 42a.

Thus, in accordance with the exemplary embodiment described above, the length (L1) of bearing portion 42a is shorter than length (L4) of the oil pocket 41b. This allows the pumping portion 42c and the pumping space 42d to deliver oil from oil pocket 41b so that the outer circumferential surface of the bearing portion 42a and the inner circumferential surface of cylinder 41 are properly lubricated as the piston 42 reciprocates within cylinder 41. Further in accordance with the exemplary embodiment described above, the length (L7) is longer length (L4) of oil pocket 41b. Length (L7), as stated above, encompasses (L1), (L5) and (L3), from the forward end of the bearing portion 42a to the aft end of the pumping portion 42c. The advantage of making the length (L7) greater than the length (L4) is that the assembly process is significantly improved due to the fact that the bearing portion 42a cannot get caught in the oil pocket 41b of cylinder 41 when piston 42 is inserted into the cylinder 41 during assembly, even though the length (L1) of the bearing assembly 42a is shorter than the length (L4) of the oil pocket portion 41b.

Figure 5:
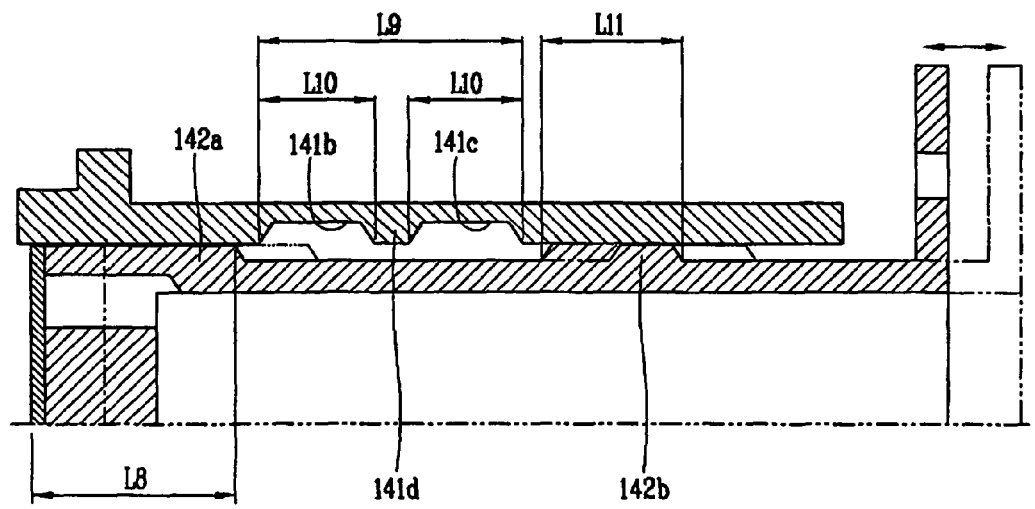
FIG. 5 is a sectional view showing a cylinder and a piston of a reciprocating compressor according to a second exemplary embodiment of the present invention.

FIG. 5 is a sectional view of a reciprocating compressor in accordance with another exemplary embodiment of the present invention. In the first exemplary embodiment, the reciprocating compressor included a piston 42 which, in turn, included a pumping portion 42c positioned between the bearing portion 42a and the support portion 42b. In the second exemplary embodiment illustrated in FIG. 5, the piston 142 does not included a pumping portion between the bearing portion 142a and the support portion 142b. Instead, there are a plurality of oil pockets, for example, oil pockets 141b and 141c, formed in the cylinder 141. Accordingly, when the length (L8) of bearing portion 142a is shorter than length (L9), i.e., the combined length of the plurality of oil pockets 141b and 141c, then the oil stored in the plurality of oil pockets is more easily applied to the circumferential surfaces of the bearing portion 142a and the cylinder 141, due to the reciprocating motion of the piston 142. At the same time, the length (L8) of the bearing portion 142a is longer than any individual one of the plurality of oil pockets 141b and 141c. Again, this prevents the piston 142, and more specifically, the bearing portion 142a of piston 142, from getting caught in an oil pocket during assembly when the piston 142 is inserted into the cylinder 141. The length (L10) of each individual oil pocket 141b and 141c is controlled by the addition of one or more separating portions, for example, separating portion 141d.

When the piston 142 reciprocates, the bearing portion 142a does not overlap oil pocket 141b. However, the support portion 142b of the piston 142 may overlap at least a portion of the rear oil pocket 141c, and preferably has a length (L11) that is sufficiently long such that oil stored in the rear oil pocket 141c can reach the outer circumferential surface of the bearing portion 142a, and the corresponding circumferential surface of the cylinder 141. If length (L11) is too short, it could get caught in, for example, the rear most oil pocket 141c. In contract, if the length (L11) of support portion 142b is too long, then the frictional losses may be excessive. Therefore, the length (L11) of support 142b should be set to minimize frictional loss, and also to prevent the support portion 142b from getting stuck in an oil pocket during reciprocation and/or the assembly process.

The operation of the reciprocating compressor according to the second exemplary embodiment is the same or similar to the operation of the reciprocating compressor according to the first exemplary embodiment. Moreover, the advantages associated with the first exemplary embodiment are likewise associated with the second exemplary embodiment. As previously stated, the aforementioned exemplary embodiments ensure proper lubrication of the piston and cylinder surfaces, thereby reducing frictional losses, and a more effective and efficient assembly process.

The foregoing embodiments and advantages are merely exemplary and are not to be construed as limiting the present disclosure. The present teachings can be readily applied to other types of apparatuses. This description is intended to be illustrative, and not limiting as to the scope of the appended claims. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents thereof are intended to be embraced by the appended claims.

What is claimed is:
1. A reciprocating compressor comprising:
   a cylinder having an inner circumferential surface that forms a piston insertion hole the inner circumferential surface including an oil pocket portion; and
   a piston positioned in the piston insertion hole, the piston having a bearing portion slidably in contact with the inner circumferential surface of the cylinder,
   wherein the length of the bearing portion is less than the length of the oil pocket portion.

2. The reciprocating compressor of claim 1, wherein the oil pocket portion comprises a plurality of oil pockets.

3. The reciprocating compressor of claim 2, wherein the length of the bearing portion is greater than one of said plurality of oil pockets.

4. The reciprocating compressor of claim 1, wherein the bearing portion is formed at one end of the piston.

5. The reciprocating compressor of claim 4 further comprises a valve, wherein the piston further comprises a suction passage lengthwise through one end of the piston, and wherein the valve opens and closes the suction passage, thereby allowing fluid to pass through the suction passage during operation of the reciprocating compressor.

6. The reciprocating compressor of claim 5, wherein the valve is disposed at the same end of the piston as the bearing portion.

7. A reciprocating compressor comprising:
a cylinder having an inner circumferential surface forming a piston insertion hole, the inner circumferential surface including an oil pocket; and
a piston positioned in the piston insertion hole, the piston having a bearing portion slidably in contact with the inner circumferential surface of the cylinder and having a pumping portion separated from the bearing portion by a gap.

8. The reciprocating compressor of claim 7, wherein the length of the bearing portion is less than the length of the oil pocket.

9. The reciprocating compressor of claim 7, wherein the piston has a diameter corresponding to the pumping portion and a diameter corresponding to the bearing portion, and wherein the diameter corresponding to the pumping portion is less than the diameter corresponding to the bearing portion.

10. The reciprocating compressor of claim 7, wherein the combined length of the bearing portion, the pumping portion, and the gap is greater than the length of the oil pocket.

11. The reciprocating compressor of claim 7, wherein the cylinder comprises an end portion opposite the bearing portion of the piston, and wherein the combined length of the end portion and the oil pocket is greater than the combined length of the bearing portion, the pumping portion and the gap.

12. The reciprocating compressor of claim 7, wherein the piston further comprises a support portion separated from the pumping portion by a gap.

13. The reciprocating compressor of claim 12, wherein the piston has a diameter corresponding to the support portion and a diameter corresponding to the bearing portion, and wherein the diameter corresponding to the support portion is less than the diameter corresponding to the bearing portion.

14. The reciprocating compressor of claim 12, wherein the support portion selectively overlaps the oil pocket during operation of the reciprocating compressor.

15. A reciprocating compressor comprising:
a cylinder having an inner circumferential surface forming a piston insertion hole, the inner circumferential surface including a plurality of oil pockets; and
a piston positioned in the piston insertion hole and slidably in contact with the inner circumferential surface of the cylinder,
wherein the piston comprises:
a bearing portion and a support portion, wherein the bearing portion and the support portion are separated by a gap, and wherein the plurality of oil pockets are positioned, at least in part, between the bearing portion and the support portion.

16. The reciprocating compressor of claim 15, wherein the piston further comprises a diameter corresponding to the support portion and a diameter corresponding to the bearing portion, and wherein the diameter corresponding to the support portion is less than the diameter corresponding to the bearing portion.

17. The reciprocating compressor of claim 15, wherein the length of the bearing portion is greater than the length of one oil pocket, and wherein the length of the bearing portion is less than the combined length of the plurality of oil pockets.

18. The reciprocating compressor of claim 1, wherein the piston is coupled to a mover of a reciprocating motor that performs a linear reciprocation.

19. The reciprocating compressor of claim 7, wherein the piston is coupled to a mover of a reciprocating motor that performs a linear reciprocation.

20. The reciprocating compressor of claim 15, wherein the piston is coupled to a mover of a reciprocating motor that performs a linear reciprocation.

21. A reciprocating compressor comprising:
a cylinder having an inner circumferential surface forming a piston insertion hole, the inner circumferential surface including a plurality of oil pockets, wherein adjacent oil pockets are separated by a separating portion; and
a piston positioned in the piston insertion hole and slidably in contact with the inner circumferential surface of the cylinder, the piston including a bearing portion and a support portion separated by a gap, and wherein the plurality of oil pockets are positioned, at least in part, between the bearing portion and the support portion.

22. The reciprocating compressor of claim 21, wherein the piston further comprises a diameter corresponding to the support portion and a diameter corresponding to the bearing portion, and wherein the diameter corresponding to the support portion is less than the diameter corresponding to the bearing portion.

23. The reciprocating compressor of claim 21, wherein the length of the bearing portion is greater than the length of one oil pocket, and wherein the length of the bearing portion is less than the combined length of the plurality of oil pockets and the separating portion between adjacent oil pockets.

* * * * *